United States Patent [19]

Shelef et al.

[11] Patent Number: 5,556,825
[45] Date of Patent: Sep. 17, 1996

[54] AUTOMOTIVE CATALYSTS WITH IMPROVED OXYGEN STORAGE AND METAL DISPERSION

[75] Inventors: Mordecai Shelef, Bloomfield Village; Rengin K. Usmen, Troy; George W. Graham, Ann Arbor, all of Mich.; William L. H. Watkins, Toledo, Ohio; Robert W. McCabe, Lathrup Village, Mich.

[73] Assignee: Ford Motor Company, Dearborn, Mich.

[21] Appl. No.: 369,635

[22] Filed: Jan. 6, 1995

[51] Int. Cl.⁶ ..................................... B01J 23/63
[52] U.S. Cl. .................. 502/303; 502/302; 502/304; 502/332; 423/213.5
[58] Field of Search .................... 502/302, 303, 502/304, 332; 423/213.5

[56] References Cited

U.S. PATENT DOCUMENTS

| | | | |
|---|---|---|---|
| 3,892,836 | 7/1975 | Compton et al. | 423/213.2 |
| 3,980,763 | 9/1976 | Mullhaupt | 423/579 |
| 4,126,430 | 11/1978 | Roberge | 55/20 |
| 4,170,573 | 10/1979 | Ernest et al. | 252/462 |
| 4,287,170 | 9/1981 | Erickson | 423/579 |
| 4,521,398 | 6/1985 | Erickson | 423/579 |
| 4,581,343 | 4/1986 | Blanchard et al. | 502/241 |
| 4,639,432 | 1/1987 | Holt et al. | 502/324 |
| 4,675,308 | 6/1987 | Wan et al. | 502/304 |
| 4,800,070 | 1/1989 | Carlin et al. | 423/210.5 |
| 4,800,189 | 1/1989 | Eschwey et al. | 502/406 |
| 4,806,519 | 2/1989 | Chiba et al. | 502/252 |
| 4,839,146 | 6/1989 | Cho et al. | 423/213.5 |
| 4,868,148 | 9/1989 | Henk et al. | 502/303 |
| 4,919,902 | 4/1990 | Bricker et al. | 423/213.5 |
| 4,940,685 | 7/1990 | Sauvion et al. | 502/263 |
| 5,064,803 | 11/1991 | Nunan | 502/170 |
| 5,137,862 | 8/1992 | Mackrodt et al. | 502/303 |

OTHER PUBLICATIONS

Dispersion Studies on the System $La_2O_3/\gamma-Al_2O_3$, M, Bettman, R. E. Chase, K. Otto, and W. H. Weber, Journal of Catalysis 117, (1989) 447–454. (Month Unknown).

Investigation of $La^{3+}$–modified $Al_2O_3$–supported $CeO_2$, G. W. Graham, P. J. Schmitz, R. K. Usmen and R. W. McCabe, Catalysis Letters 17 (1993) 175–184 (Month Unknown).

An XPS Study of Interactions in Thin Films Containing a Noble Metal With Valence–Invariant and Reducible Oxides, Shelef et al., Journal of Catalysis 137, 114–126 (1992). (Month Unknown).

*Primary Examiner*—Shrive Beck
*Assistant Examiner*—Timothy H. Meeks
*Attorney, Agent, or Firm*—Lorraine S. Melotik

[57] ABSTRACT

This invention is a method for preparing an automotive catalyst system. It comprises the steps of providing a substrate, providing a gamma-alumina support material, depositing a lanthana precursor and calcining the precursor, depositing an oxygen storage material precursor like ceria precursor and calcining this precursor material, and subsequently depositing catalytic material like platinum on the oxygen storage material. The alumina may be initially washcoated on the substrate or at any stage after deposition of the lanthana precursor.

20 Claims, 1 Drawing Sheet

AUTOMOTIVE CATALYSTS WITH IMPROVED OXYGEN STORAGE AND METAL DISPERSION

FIELD OF THE INVENTION

This invention is an automotive catalyst incorporating lanthana into a washcoat carried on gamma-alumina in a fashion so as to form a barrier between the gamma-alumina and other ingredients such as ceria or mixtures of ceria and praseodymia which serves to improve the preservation of both the oxygen storage capacity and dispersion of employed active metals such as platinum or palladium.

BACKGROUND OF THE INVENTION

Slow but persistent decrease in the performance of automotive catalysts during prolonged use at the prevailing high temperatures is a phenomenon requiring continuous improvement. This is especially pertinent with respect to the regulations requiring a lifetime greater than 100,000 miles at very low emission limits. Also, the on-board monitoring of such a gradual loss of catalyst activity calls for improved catalytic materials. The loss of activity is related to the loss of a property called "oxygen storage" and to the loss of the dispersion of the active noble metals. This invention relates to the improvement of both aforesaid catalyst attributes.

Specifically, the invention teaches the incorporation of one of the possible ingredients of the active part of the catalyst named "washcoat" in a specific way so as to improve the preservation of oxygen storage and active metal dispersion. The aforesaid ingredient is lanthanum oxide, also known as lanthana. It has been known for some time that the dispersion of lanthana on high-surface-area gamma-alumina, the main surface-area-providing ingredient of the washcoat, inhibits the loss of alumina surface area. More recently, it was found that incorporation of lanthana at the surface of the alumina also results in a higher dispersion of ceria under certain conditions and that lanthana inhibits a reaction between ceria and alumina, both of which could improve oxygen storage and its preservation.

Nevertheless, the literature contains evidence that these latter beneficial effects of lanthana on oxygen storage capacity could well be negated by a direct reaction between the lanthana and ceria. Furthermore, there exists evidence in the literature that lanthana reacts directly with rhodium, one of the main noble metals present in current automotive catalysts, in a way that inhibits its activity.

The subject of this invention is based on our unexpected discovery that when lanthana is deposited in a fashion as described in detail hereinafter so as to form a barrier between the alumina and the ceria or mixtures of ceria and praseodymia, and then an active noble metal such as platinum or palladium is subsequently deposited, there is no inhibition of the oxygen storage capacity or noble metal activity, but rather there is improved preservation of both attributes. Certain conditions have been found necessary in order to obtain these results. Mainly, it is important to coat the alumina with a substantially atomic layer thickness of lanthana, i.e., a layer at least one to two atomic layers thick. In addition, when coating the alumina with lanthana, it is critical that calcination of the lanthana precursor not be performed at too high a temperature in order to prevent formation of a bulk phase at this step in the process.

DISCLOSURE OF THE INVENTION

The invention is a method for preparing an automotive catalyst system, which comprises the steps of:

providing a substrate;

providing a gamma-alumina support material;

depositing lanthana precursor on the alumina support from an aqueous solution of the precursor in an amount suitable to form a substantially atomic thickness layer of lanthana upon calcination of the precursor;

calcining the lanthana precursor at a temperature of less than about 550° C. to convert the lanthana precursor to a substantially atomic thickness layer of lanthana;

depositing a layer of oxygen storage material precursor selected from the group consisting of ceria precursor, praseodymia precursor, and mixtures thereof on the lanthana layer;

calcining the oxygen storage material precursor at a temperature of less than about 650° C. to convert the oxygen storage precursor to the oxide thereof;

depositing at least a partial layer of catalytic material selected from platinum, palladium, or mixtures thereof on the oxygen storage; and calcining the catalytic material at a temperature less than about 550° C. to form the automotive catalytic system.

The gamma-alumina washcoat support layer may provided on the substrate initially or after deposition of at least the lanthana. The method may further comprise providing catalytic material selected from rhodium, or rhodium and platinum, carried on zirconia or other suitable support material.

According to another aspect, the invention is also directed to the catalyst made by the method disclosed above.

DETAILED DESCRIPTION OF PREFERRED EMBODIMENTS

Figure 1:
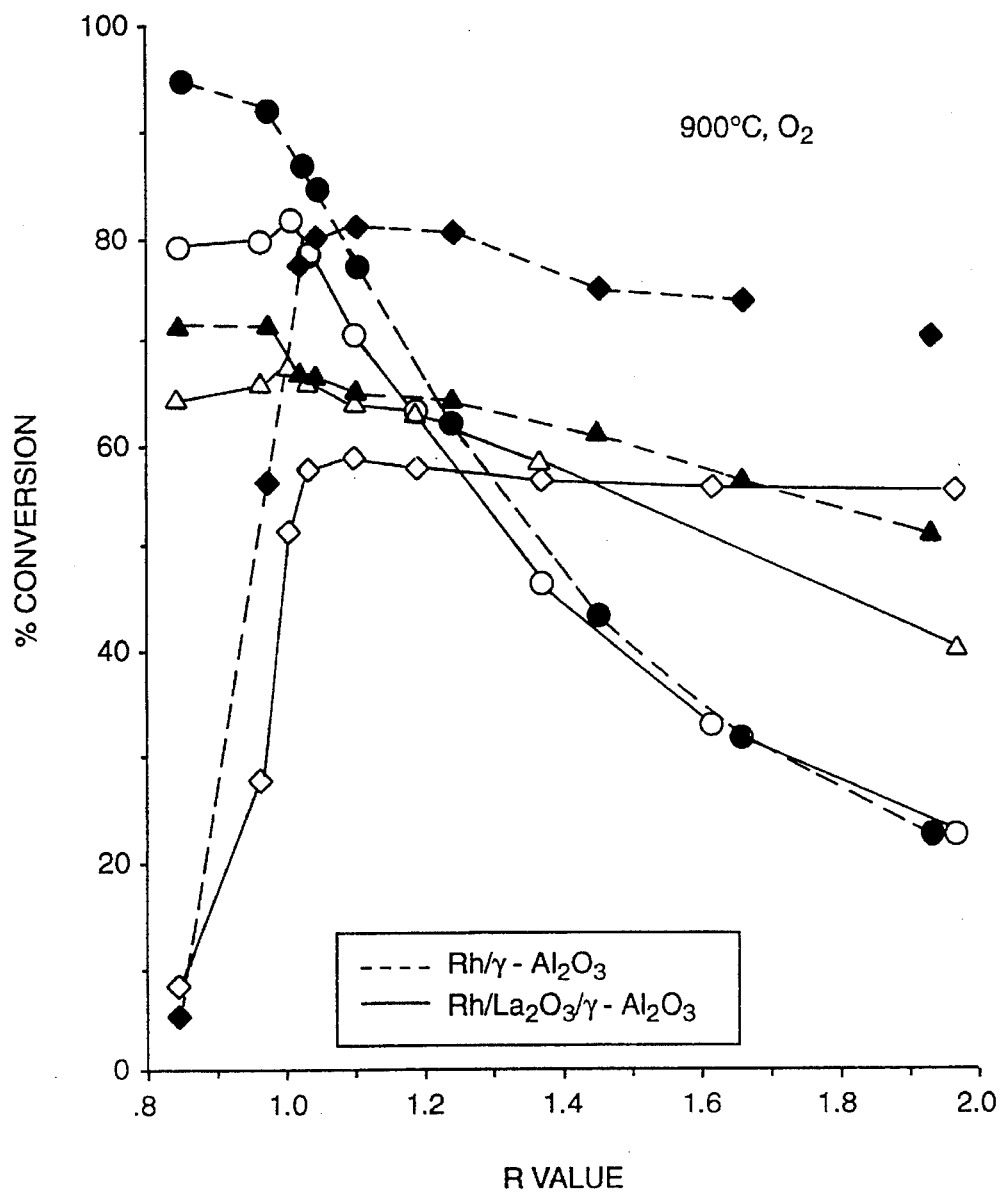
FIG. 1 shows the conversions of hydrocarbon (HC), carbon monoxide (CO), and nitric oxide (NO) as a function of the molar ratio of reducing species to oxidizing species, R, varied by changing the amount of $O_2$ in the feed of a simulated automotive exhaust gas, for two comparative example rhodium containing catalysts, the first containing an interposing lanthana layer and the other being a comparative example containing no such layer.

According to the present invention, a substrate for the catalyst system is selected. The substrate may be of the general type known, such as a monolithic ceramic substrate, a monolithic metallic substrate, or pelletized catalytic substrate. The substrate may be washcoated with a desired amount of gamma-alumina support material, for example, 10 to 30% by weight based on the weight of the substrate. Preferably the alumina is a high surface area transitional alumina of at least 90 $m^2/g$, nominally designated gamma, but more generally containing a mixture of phases such as gamma, delta, and theta. The gamma-alumina is desirably first dried in air at a temperature of about 100° C. or other suitable temperature as may be selected. Alternately, the alumina support may be provided on the substrate after at least being provided with the lanthana.

A substantially atomic-thickness coating of lanthana is provided on the alumina support material. As discussed above, the alumina may have been washcoated on the substrate or be present as a powder. Providing the lanthana comprises providing a lanthana precursor on the alumina. This may be done by impregnating the alumina with an aqueous solution of a lanthana precursor such as a soluble lanthanum salt, like lanthanum nitrate, using the incipient wetness method. The lanthana precursor is provided in an amount sufficient to provide lanthana, after calcination, in a substantially atomic thickness, i.e., lanthana essentially about one to two layers thick. At any stage in the method of the present invention, e.g., before calcination of the lanthana precursor or after calcination, the washcoat material may be provided on the substrate if not already washcoated thereon. For simplicity of discussion, it will be taken that the alumina was initially washcoated on the substrate prior to impregnation with the lanthana precursor. This invention method is not however to be so limited.

After the alumina is impregnated with lanthana precursor, the impregnated alumina is generally dried and then is calcined at a temperature below about 550° C., preferably between about 450° C. and about 550° C., optimally for at least 2 hours, preferably between about 2 and about 6 hours, to convert the lanthanum salt to its oxide, lanthana. In this invention, the lanthana coating on the alumina is preferably present in an amount comparable to at least 8.5 µmol La/m$^2$ of alumina but not more than 17 µmol La/m$^2$ of alumina in order to be present in the desired thickness. This corresponds to between about 10% and 20% by weight, respectively, of lanthanum based on the alumina.

An oxygen storage material precursor selected from the group consisting of ceria precursor, praseodymia precursor, and mixtures thereof is then deposited on the lanthana. It may be done by impregnating the lanthana using incipient wetness techniques with an aqueous solution of this precursor, which may be a soluble salt such as cerium nitrate. A calcination schedule similar to that described for the lanthanum precursor is carried out for the oxygen storage material precursor, except that the calcination temperature is generally below about 650° C., preferably between about 500° C. and about 650° C. This calcination converts the precursor to the oxygen storage material which is the respective oxide, e.g., ceria, praseodymia, or mixture thereof. The oxygen storage materials in this invention are preferably present in an amount of at least 5% by weight but not more than 20% by weight based on the total weight of washcoat material, i.e., the total of alumina and lanthana.

After the calcination of the oxygen storage material precursor, at least a partial layer of catalytic material selected from platinum, palladium, or mixtures thereof is deposited on the oxygen storage material layer. This may be done by a number of techniques including impregnating the material with an aqueous solution of one of these catalytic salts which is soluble, e.g., with a $H_2PtCl_6$ solution. Optimally, these catalytic materials are provided in an amount of at least 0.3% by weight catalysts, e.g., platinum, on alumina but not more than 3% by weight (based on total weight of washcoat). In addition to the incipient wetness techniques discussed for providing the various precursors and catalytic material, still other methods will be apparent to those skilled in the art in view of the present disclosure. Subsequently the catalytic material is calcined at a temperature less than about 55° C. to form the automotive catalytic system.

Still other washcoats embodiments, prepared according to other methods which would be apparent to those skilled in the art in view of the present disclosure, providing catalytic material selected from rhodium, or rhodium and platinum, carried on zirconia or other suitable support material, may then be applied to the substrate. Alternatively, distinct washcoats comprising embodiments of the present invention, and other washcoats providing rhodium, etc. as above, may be prepared separately, admixed, and applied together to the substrate according to methods known to those skilled in the art in view of the present disclosure.

EXAMPLE 1

A series of catalyst support materials containing ceria and/or lanthana on alumina were prepared as follows, examples A, D, F, G, H, L, M, P, Q, T, U, V (catalyst supports) and 6 are comparative examples not according to the present invention, while the remaining are according to the present invention:

Catalyst Support A of 15%CeO$_2$/Al$_2$O$_3$

A ceria on alumina support material was prepared by combining 300 grams of defumed alumina powder (Degussa "C" flame hydrolyzed alumina; surface area of 90–100 m$^2$/g) with an aqueous solution of cerium nitrate (Ce(NO$_3$)$_3$6H$_2$O) containing 43 grams of cerium. The resulting slurry was slowly heated in air on a hot plate (near 100° C.) under constant stirring to evaporate excess liquid and was then dried overnight at 120° C. The dried sample was calcined in air in a muffle furnace at 450° C. for 5 hours.

Catalyst Support B of 10%La$_2$O$_3$/Al$_2$O$_3$

A lanthana on alumina support material was prepared in a procedure identical to the ceria/alumina support material above (Example 1-A) by combining 34.7 grams of alumina with an aqueous solution of lanthanum nitrate (La(NO$_3$)$_3$5H$_2$O) containing 3.29 grams of lanthanum. The resulting slurry was dried and calcined in identical fashion to the ceria/alumina support material (Example 1-A).

Catalyst Support C of 15%CeO$_2$/10%La$_2$O$_3$/Al$_2$O$_3$

A portion of the catalyst support of Example 1-B was mixed with an aqueous solution of cerium nitrate at a concentration of 0.144 grams of cerium per gram of lanthana/alumina support material. The resulting slurry was dried and calcined as per Example 1-A.

Catalyst Support D of 10%CeO$_2$/Al$_2$O$_3$

A ceria on alumina support material was prepared in a procedure identical to Example 1-A above by combining 55.8 grams of alumina with an aqueous solution of cerium nitrate containing 5.3 grams of cerium. The resulting slurry was dried and calcined in identical fashion to the ceria/alumina support material of Example 1-A.

Catalyst Support E of 10%CeO$_2$/10%La$_2$O$_3$/Al$_2$O$_3$

A ceria on lanthana-modified alumina support material was prepared in a procedure identical to Example 1-C using a portion of the 10%La$_2$O$_3$/Al$_2$O$_3$ support material as prepared in Example 1-B. The lanthana/alumina support material was combined with an aqueous solution of cerium nitrate at a concentration of 0.095 grams of cerium per gram of lanthana/alumina support material. The resulting slurry was dried and calcined in identical fashion to the ceria/alumina support material of Example 1-A.

EXAMPLE 2

A series of support materials containing mixed phases of praseodymia and ceria on both alumina and lanthana-modified alumina were prepared as follows:

A solution of mixed nitrates of praseodymium and cerium was prepared by adding praseodymium nitrate (Pr(NO$_3$)$_3$·6H$_2$O) and cerium nitrate Ce(NO$_3$)$_3$·6H$_2$O) to water (containing dilute nitric acid) at a concentration of 25 grams each of praseodymium and cerium in 500 ml of dilute acid solution.

Support F

Ten grams of alumina were combined with 48.2 milliliters of the mixed nitrate solution, dried, and calcined at 550° C. for 5 hours to prepare a support material containing 7.5 wt % Pr and 7.5 wt % Ce on $Al_2O_3$.

Supports G and H

Portions of the calcined Support F were aged in a muffle furnace in air at 800° C. (Support G) and 900° C. (Support H) for 12 hours.

Support I

Ten grams of lanthana-modified alumina (prepared by the procedure outlined in Example 1-B) were combined with 48.2 milliliters of mixed praseodymium and cerium nitrate solution, dried, and calcined at 500° C. for 5 hours to prepare a support material containing 7.5 wt % Pr and 7.5 wt % Ce on 10wt % $La_2O_3/Al_2O_3$.

Supports J and K

Portions of the calcined Support I were aged in a muffle furnace in air at 800° C. (Support J) and 900° C. (Support K) for 12 hours.

Each of the support materials above (Supports F–K) was examined by temperature programmed reduction (TPR). The TPR experiments were carried out in a commercial apparatus from the Altamira Company. The samples (approximately 100 milligrams) were loaded into a quartz tube retained by small plugs of quartz wool. The quartz tube was positioned in a furnace used to both pretreat and ramp the temperature of the sample during reduction experiments. The samples were normally oxidized in a 40 $cm^3$/min flow of 10% oxygen in helium at 550° C. for fifty minutes. The samples were then cooled in oxygen to 4° C. (with the aid of an ice bath) prior to the start of the temperature-programmed reduction. The TPR data were obtained by heating in 9% hydrogen in argon to 600° C. at a rate of 30 degrees per minute and the hydrogen consumption was monitored with a thermal conductivity detector.

The TPR profiles yield peaks at various temperatures associated with reduction events occurring in the sample material. The areas under the peaks (after correction for baseline drift) are proportional to the amount of hydrogen consumed, which in turn, can be related to the extent of reduction of the catalyst or support material. Table 1 summarizes the quantities of hydrogen consumed for each of the samples F through K.

TABLE 1

| | Hydrogen Consumption (μmol/g) of Catalysts F–K | | | |
|---|---|---|---|---|
| Catalyst Support | Theoretical | <600° C. | % reduced <600° C. | <900° C. |
| F | 445 | 152 | 34 | 432 |
| G | 445 | 54 | 12 | 198 |
| H | 445 | 74 | 17 | 210 |
| I | 445 | 145 | 33 | 313 |
| J | 445 | 71 | 16 | 230 |
| K | 445 | 99 | 22 | 278 |

Comparing the fresh (i.e as calcined) Supports I and F, it can be seen that the addition of lanthana as a surface modifier has little effect on the reducibility at temperatures below 600° C. (i.e. the most important temperature range for oxygen storage in an automotive catalyst). However, after aging at 800° and 900° C., the samples containing lanthana (J and K) show much greater reducibility at temperatures below 600° C. than their counterparts without lanthana (G and H). These results clearly show that an interposing layer of lanthana, added between the alumina and mixed praseodymia/ceria phases, preserves the oxygen storage components (praseodymia and ceria) in a more reducible state than can be obtained in the absence of lanthana. Since oxygen storage capacity relates to the ability to alternately reduce and oxidize the storage agents, the TPR data of Table 1 suggest that a catalyst prepared on a lanthana modified alumina support should display better oxygen storage characteristics than a catalyst prepared on a support devoid of lanthana.

EXAMPLE 3

A series of palladium and ceria containing catalysts were prepared as follows:

Catalyst L

A portion of catalyst support material from Example 1-A was combined with an aqueous solution of palladium chloride ($PdCl_2$) at a concentration of 0.0152 grams Pd per gram of support material. The resulting mixture was dried and calcined in a muffle furnace at 550° C. for 5 hours.

Catalyst M

A portion of Catalyst L was thermally aged in a muffle furnace at 900° C. for 12 hours in air.

Catalyst N

A portion of catalyst support material from Example 1-C was combined with an aqueous solution of palladium chloride at a concentration of 0.0152 grams Pd per gram of support material. The resulting mixture was dried and calcined in a muffle furnace at 550° C. for 5 hours.

Catalyst O

A portion of Catalyst N was thermally aged in a muffle furnace at 900° C. for 12 hours in air.

Each of the catalyst powders prepared above was examined by temperature programmed reduction. The hydrogen consumptions of the various catalysts are summarized in Table 2 below.

TABLE 2

| | Hydrogen Consumption (μmol/g) of Catalysts L–O | | | |
|---|---|---|---|---|
| Catalyst Support | Theoretical | <600° C. | % reduced <600° C. | <900° C. |
| L | 676 | 278 | 41 | 783 |
| M | 676 | 197 | 29 | 683 |
| N | 676 | 271 | 40 | 617 |
| O | 676 | 220 | 33 | 737 |

By reference to Table 2, it is immediately apparent that Catalyst O, containing the lanthana interposing layer, is superior in hydrogen uptake during temperature programmed reduction to Catalyst M, without such a layer.

Thus, the catalyst containing the lanthana interposing layer is more resistant to deleterious effects of thermal aging than the catalyst without such a layer.

EXAMPLE 4

A series of palladium and ceria and praseodymia containing catalysts were prepared as follows:

Catalyst P

A 3.9 gram sample of support material F (prepared according to Example 2 above) was combined with 1.04 milliliters of a palladium nitrate solution containing 0.057 grams of Pd per milliliter. The mixture was dried and calcined at 550° C. for 5 hours.

Catalyst Q

A portion of Catalyst P was thermally aged in a muffle furnace at 900° C. for 12 hours in air.

Catalyst R

A 3.9 gram sample of support material I (prepared according to Example 2 above) was combined with 1.04 milliliters of a palladium nitrate solution containing 0.057 grams of Pd per milliliter. The mixture was dried and calcined at 550° C. for 5 hours.

Catalyst S

A portion of Catalyst R was thermally aged in a muffle furnace at 900° C. for 12 hours in air.

Each of the catalyst powders prepared above was examined by temperature programmed reduction. The hydrogen consumptions of the various catalysts are summarized in Table 3 below.

TABLE 3

| Hydrogen Consumption (μmol/g) of Catalysts P–S | | | |
|---|---|---|---|
| Catalyst | Theoretical | <600° C. | % reduced <600° C. | <900° C. |
| P | 586 | 260 | 44 | 508 |
| Q | 586 | 83 | 14 | 237 |
| R | 586 | 366 | 62 | 523 |
| S | 586 | 138 | 24 | 414 |

By reference to Table 3, it is immediately apparent that Catalysts P and S, both containing the lanthana interposing layer, are superior in hydrogen uptake during temperature programmed reduction to Catalysts P and Q, without such a layer. Thus, the catalysts containing the lanthana interposing layer are superior and more resistant to deleterious effects of thermal aging than the catalysts without such a layer.

EXAMPLE 5

A series of platinum and ceria containing catalysts were prepared as follows:

Catalyst T

Core samples of automotive ceramic monolith material (400 cell per square inch; 6 mil wall thickness) were obtained from Johnson Matthey coated with gamma-alumina. The BET area of the coated monolith was measured to be about 31–34 grams/m$^2$, indicating an alumina washcoat loading of 30–35% by weight. A piece of washcoated core sample (0.75 inch diameter by 0.5 inch length) was then impregnated with cerium nitrate from aqueous solution. A 2 gram core sample of alumina-coated monolith (0.66 gram of alumina) was contacted with 0.06 gram of cerium (as cerium nitrate) in aqueous solution. The ratio of weight of solution used to weight of monolith core sample was 2.5-to-1. The coating was done by immersing the core sample in the solution in a small volume glass beaker that ensured complete filling of the monolith channels by the impregnating solution. The excess liquid was slowly evaporated away and the sample was turned over occasionally as the level of liquid fell below the height of the core sample. Once evaporated to dryness, the core sample was calcined in a muffle furnace at 500° C. for 5 hours.

The calcined 10% $CeO_2/Al_2O_3$ washcoat on cordierite substrate was next impregnated with platinum from chloroplatinic acid ($H_2PtCl_6$) solution. The impregnation technique employed was identical to that used in coating the core sample with cerium nitrate solution. A quantity of chloroplatinic acid solution containing 0.046 grams Pt was used to prepare a catalyst of final composition 0.6 wt % Pt/10 wt % $CeO_2/Al_2O_3$ on cordierite substrate. The catalyst was calcined a second time at 500° C. for 5 hours after impregnation of the Pt.

Catalyst U

A core sample of Catalyst T was thermally aged in a laboratory bench reactor for 4 hours at 550° C. followed by 4 hours at 650° C. followed by 4 hours at 700° C. followed by 4 hours at 800° C. in a stream of flowing (3.2 1/min) simulated exhaust gas composed of 1000 vppm $C_3H_6$, 500 vppm $C_3H_8$, 1.3% CO, 0.33% $H_2$, 20 vppm $SO_2$, 974 vppm NO, $O_2$ at a concentration alternating between 1.26% and 1.65% at a frequency of 0.05 Hz, and the balance $N_2$. Space velocity was kept constant at 60,000 h$^{-1}$. The two oxygen concentrations represent oscillation back and forth between a net reducing condition (1.26% $O_2$) and a net oxidizing condition (1.65% $O_2$).

Catalyst V

A core sample of Catalyst T was thermally aged in a muffle furnace with retort at 950° C. for 24 hours in a stream of flowing (200 cc/min) air containing 10% water.

Catalyst W

Preparation of catalyst W, containing an interposing layer of lanthana between the alumina and both the ceria and platinum, was carried out in similar fashion to catalyst I. A layer of lanthana, consisting of 10% by weight of the alumina loading on the cordierite substrate, was impregnated from aqueous solution of lanthanum nitrate. After drying and calcining at 500° C. for 5 hours, the ceria and platinum were added sequentially as for catalyst I.

Catalyst X

A core sample of Catalyst W was thermally aged in a laboratory bench reactor for 4 hours at 550° C. followed by 4 hours at 650° C. followed by 4 hours at 700° C. followed by 4 hours at 800° C. in a stream of flowing (3.2 1/min) simulated exhaust gas composed of 1000 vppm $C_3H_6$, 500 vppm $C_3H_8$, 1.3% CO, 0.33% $H_2$, 20 vppm $SO_2$, 974 vppm NO, $O_2$ at a concentration alternating between 1.26% and 1.65% at a frequency of 0.05 Hz, and the balance $N_2$. Space velocity was kept constant at 60,000 h$^{-1}$.

Catalyst Y

A core sample of Catalyst W was thermally aged in a muffle furnace with retort at 950° C. for 24 hours in a stream of flowing (200 cc/min) air containing 10% water.

Each of the catalysts prepared above was examined by temperature programmed reduction. In addition, the oxygen storage capacity of Catalysts T, U, W, and X was measured by a pulsed carbon monoxide transient method as follows: A core sample of volume 3.6 cm$^3$ was held at 600° C. in a flow (3 1/min.) of helium containing alternating pulses of 1% carbon monoxide and 0.5% oxygen. Switching between the gases was performed at a frequency of 0.016 Hz, and gas sampling was through a sapphire leak valve into a quadruple mass spectrometer using one stage of differential pumping. Oxygen storage was computed from the rate of carbon monoxide removal immediately following the transition from oxygen to carbon monoxide. Finally, the platinum dispersion in each of the catalysts was also measured by a carbon monoxide-hydrogen titration method as follows: Approximately 0.1 g of monolith was ground and packed in a glass U-tube between plugs of quartz wool. The sample was then oxidized in flowing oxygen (40 cm$^3$/min.) for 30 minutes at 400° C. and then reduced in flowing hydrogen (40 cm$^3$/min.) for 30 minutes. After cooling to room temperature in flowing hydrogen, 2 pulses of carbon monoxide of 2 cm$^3$ each were introduced to the sample with hydrogen as a carrier gas. The sample was then purged with hydrogen for 10 minutes. The U-tube was then sealed to trap the hydrogen and adsorbed carbon monoxide and the sample heated at 400° C. for 30 to 45 minutes to hydrogenate the adsorbed carbon monoxide. The amount of methane formed in the reaction was measured by a flame ionization detector on a Varian Star 3400 Gas Chromatograph. Platinum dispersion was computed from the ratio of methane to platinum assuming that each methane molecule originated from one carbon monoxide molecule adsorbed on each surface platinum atom. The hydrogen consumption, oxygen storage capacity, and platinum dispersion of the various catalysts are summarized in Table 4 below.

TABLE 4

Hydrogen Consumption (μmol/g), Oxygen Capacity (μmol/g-s), and Platinum Dispersion (%) of Catalysts T–Y

| Catalyst | Theoretical Hydrogen Consumption | Hydrogen Consumption <900° C. | Oxygen Storage Capacity | Platinum Dispersion |
|---|---|---|---|---|
| T | 352 | 260 | 4.4 | 20.7 |
| U | 352 | 111 | 2.4 | 0.50 |
| V | 352 | 131 | — | 0.65 |
| W | 352 | 260 | 9.1 | 24.9 |
| X | 352 | 194 | 5.7 | 4.50 |
| Y | 352 | 131 | — | 1.35 |

By reference to Table 4, it is immediately apparent that Catalyst X, containing the lanthana interposing layer, is superior in hydrogen uptake during temperature programmed reduction to Catalyst U, without such a layer. Further, Catalysts W and X, both containing the lanthana interposing layer, are superior in oxygen storage capacity to Catalysts T and U, without such a layer. Additionally, Catalysts W, X, and Y, all containing the lanthana interposing layer, are superior in platinum dispersion to Catalysts T, U, and V, without such a layer. In general, by these measures, the catalysts containing the lanthana interposing layer are superior and/or more resistant to deleterious effects of thermal aging than the catalysts without such a layer.

EXAMPLE 6

As a counter example to the beneficial effects of combining alumina, lanthana, ceria, and either Pt or Pd in a layered catalyst configuration according to Examples 1–5, a rhodium on lanthana-coated alumina catalyst was prepared and compared to an equivalently loaded rhodium on alumina catalyst.

A 10wt % La$_2$O$_3$/Al$_2$O$_3$ sample was prepared by impregnating gamma-alumina powder (Aesar, Johnson Matthey, Inc.) with La(NO$_3$)$_3$6H$_2$O solution of appropriate concentration by the incipient wetness method. The resulting slurry was dried at 100° C. and calcined at 550° C. for 4 hours. Rhodium-containing catalysts were then prepared at a weight loading of 0.6% by impregnating both the blank gamma-alumina and the lanthana-coated gamma-alumina with Rh(NO$_3$)$_3$2H$_2$O of the appropriate concentration by the incipient wetness method. Both catalysts were dried at 100° C. and calcined at 550° C. for 4 hours.

The two Rh-containing catalysts were aged in a laboratory reactor by heating in a stream of 10% O$_2$ in helium at 900° C. for 1 hour. They were subsequently evaluated in a bench flow reactor. The activities were measured at 550° C. at a space velocity of 60,000 h$^{-1}$. The feed gas composition, simulating an engine exhaust gas near stoichiometry, was 1.5 vol % CO, 0.5 vol % H$_2$, 1500 vol. ppm HC (consisting of 1000 vol. ppm of propylene and 500 vol. ppm of propane), 1000 vol. ppm of NO, 0.6 vol % to 1.4 vol % O$_2$, 20 vol. ppm SO$_2$, and balance N$_2$. FIG. 1 shows the conversions of hydrocarbon (HC), carbon monoxide (CO) and nitric oxide (NO) at 900° C. as a function of the molar ratio of reducing species to oxidizing species, R, varied by changing the amount of O$_2$ in the feed. For all three pollutant species, the catalyst without lanthana yielded higher conversion. Differences were especially pronounced for NO on the rich side (i.e. excess reductants (R>1)) and for CO on the lean side (excess oxidants (R<1)).

The example above clearly shows that in this case the addition of lanthanum, by essentially the same technique employed in the present invention, has a deleterious effect on the performance of the rhodium/alumina catalyst. Temperature-programmed reduction experiments were carried out on the lanthana-modified Rh/Al$_2$O$_3$ catalysts after the 900° C. aging treatment. The reduction profile was similar to that which has been reported for bulk lanthanum rhodate compounds, suggesting the possibility that Rh and lanthana form a bulk compound that is much less active than Rh by itself. Ceria has also been reported to form compounds with Rh that interfere with the catalytic performance of the Rh. In light of these observations, it is surprising that both Pt and Pd, two noble metals that are closely related to Rh, do not show similar deactivation when modified by both lanthana and ceria according to the preferred preparative procedures described in the present invention.

EXAMPLE 7

This example describes a method of formulating a three-way automobile catalyst so as to preserve the benefits of the stepwise, sequential promotion of Pd and Pt by lanthana and ceria on alumina, while simultaneously incorporating a separate phase of Rh on alumina, zirconia, or other appropriate support material devoid of lanthana.

A Pt/CeO$_2$/La$_2$O$_3$/Al$_2$O$_3$ powder material is first made following the procedure outlined in Example 5. A second powder material consisting of Rh on a suitable high-temperature stable support is then prepared. This stable support material can consist of thermally stabilized alumina or zirconia phases such as, but not limited to, 1) barium stabilized alumina or 2) ceria (or yttria) stabilized zirconia. Lanthana, however, should not be used as either the support or support stabilizer for the Rh-containing phase.

The second powder material is prepared by combining, for example, an aqueous solution of rhodium nitrate with barium-stabilized alumina powder to form a slurry which is then dried at 100° C. and calcined at 450° C. The second powder material (Rh-containing phase) is then combined with the first powder material (Pt and/or Pd-containing phase) in an aqueous slurry in a pH range where dissolution of both the noble metals and support materials is negligible. The combined slurry is then coated onto a standard honeycomb automotive catalyst support (ceramic or metallic), dried and calcined at 450° C.

Various modifications can be made to the formulation procedure above in keeping with the objective of maintaining the lanthana-promoted Pt and Pd phase separate from the Rh phase which is free of lanthana. For example, instead of coating the honeycomb substrate with an aqueous mixture of the two phases, one phase can be coated on the substrate first, followed by drying and calcination of that phase. Then the procedure can be repeated for the second phase which resides as a topcoat on the underlying phase in a dual layer configuration.

We claim:

1. A method for preparing an automotive catalyst system, which comprises the steps of:

providing a substrate;

providing gamma-alumina support material;

depositing lanthana precursor on said alumina support material from an aqueous solution of said precursor in an amount suitable to form a substantially atomic thickness layer of lanthana upon calcination of the precursor;

calcining said lanthana precursor at a temperature of less than about 550° C. to convert said lanthana precursor to a substantially atomic layer of lanthana;

depositing a layer of oxygen storage material precursor selected from the group consisting of ceria precursor, praseodymia precursor, and mixtures thereof on said lanthana layer;

calcining said oxygen storage material precursor at a temperature of less than about 650° C. to convert said oxygen storage precursor to the oxide thereof;

depositing at least a partial layer of catalytic material selected from platinum, palladium, or mixtures thereof on said oxygen storage material; and calcining said catalytic material at a temperature less than about 550° C. to form said automotive catalytic system.

2. The method according to claim 1 wherein said aqueous solution of said lanthana precursor comprises a solution of a soluble lanthanum salt, said deposited lanthana precursor being calcined at a temperature between about 450° C. and about 550° C. forming lanthana.

3. The method according to claim 2 wherein said lanthanum salt is lanthanum nitrate.

4. The method according to claim 1 wherein said oxygen storage material is calcined at a temperature between about 500° C. and 650° C.

5. The method according to claim 1 wherein said step of depositing said oxygen storage material precursor comprises impregnating said lanthana with an aqueous solution including salts selected from the group consisting of cerium salt, praseodymium salt, and mixtures thereof and then calcining said impregnated lanthana at a temperature below about 650° C. forming oxides selected from the group consisting of ceria, praseodymia, and mixtures thereof.

6. The method according to claim 5 wherein said cerium salt and said praseodymium salt are in the form of their nitrate salts.

7. The method according to claim 1 wherein said lanthana coating on said alumina is present in an amount corresponding to at least 8.5 µmole La/m$^2$ of alumina but not more than 17 µmole La/m$^2$ of alumina.

8. The method according to claim 1 which further comprises the step of applying a washcoat support layer containing catalytic material selected from the group consisting of rhodium, and rhodium and platinum, carried on zirconia onto said substrate.

9. The method according to claim 1 wherein said step of depositing said oxygen storage material comprises providing said oxygen storage material in an amount of between about 5 and about 20 weight percent based on the total weight of alumina and lanthana.

10. The method according to claim 1 wherein said step of depositing said catalytic material comprises depositing said material from a solution of a water soluble salt of the material to provide a loading of about 0.3 to 3 weight percent said catalytic material based on the total weight of alumina, lanthana and oxygen storage material.

11. A automotive catalyst system, which comprises:

a substrate;

a gamma-alumina washcoat support material;

a substantially atomic layer thickness of lanthana deposited on said alumina;

a layer of oxygen storage material selected from the group consisting of ceria, praseodymia, and mixtures thereof deposited on said lanthania coating; and at least a partial layer of catalytic material selected from platinum, palladium, or mixtures thereof deposited on said oxygen storage material.

12. The system according to claim 11 wherein said lanthana is deposited by impregnating said gamma-alumina with an aqueous solution of a lanthanum salt and then calcining said impregnated alumina at a temperature below about 550° C. forming lanthana.

13. The system according to claim 12 wherein said lanthanum salt is lanthanim nitrate.

14. The system according to claim 12 wherein said temperature of calcining said lanthanum salt impregnated alumina is between about 450° C. and 550° C.

15. The system according to claim 12 wherein said oxygen storage material is impregnated into said lanthana from an aqueous solution comprising salts selected from the group consisting of cerium salt, praseodymium salt, and mixtures thereof and said impregnated lanthana is calcined at a temperature below about 650° C. forming oxides selected from the group consisting of ceria, praseodymia, and mixtures thereof.

16. The system according to claim 15 wherein said cerium salt and said praseodymium salt are in the form of their nitrate salts.

17. The system according to claim 11 wherein said lanthana coating on said alumina is present in an amount corresponding to at least 8.5 µmole La/m$^2$ of alumina but not more than 17 µmole La/m$^2$ of alumina.

18. The system according to claim 11 which further includes catalytic material selected from the group consisting of rhodium, and rhodium and platinum, carried on zirconia deposited onto said substrate.

19. The system according to claim 11 wherein said oxygen storage material is present in an amount of between about 5 and about 20 weight percent based on the total weight of alumina and lanthana.

20. The system according to claim 11 wherein said catalytic material is deposited from a solution of a water soluble salt of the material to provide a loading of about 0.3 to 3.0 weight percent based on the weight of catalytic material to the total weight of alumina, lanthana and oxygen storage material.

* * * * *